Oct. 7, 1952     D. A. RICHARDSON     2,612,958
HYDRAULICALLY OPERATED ENGINE-PROPELLER CONTROL

Filed Aug. 30, 1945     8 Sheets-Sheet 1

INVENTOR
David A. Richardson
BY
Spencer Hardman & Fehr
his ATTORNEYS

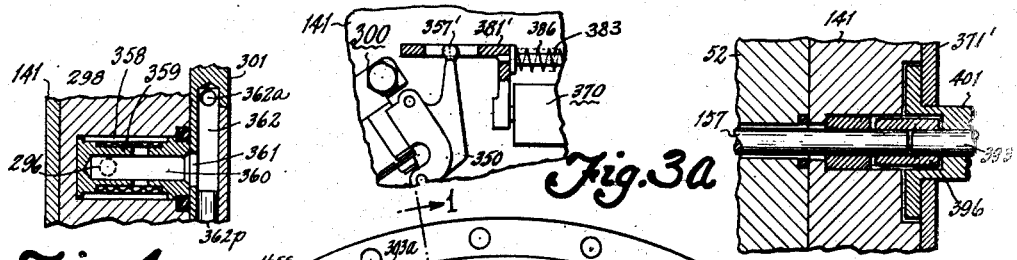
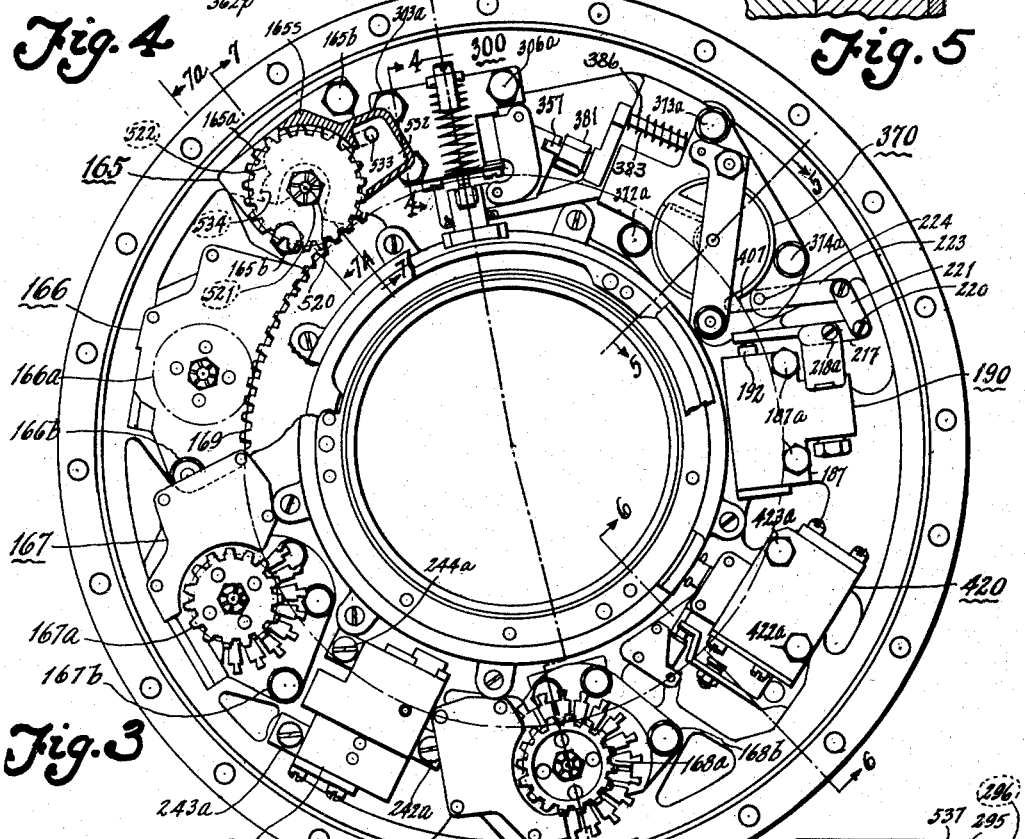
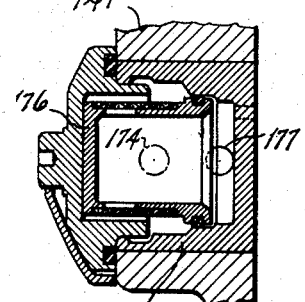
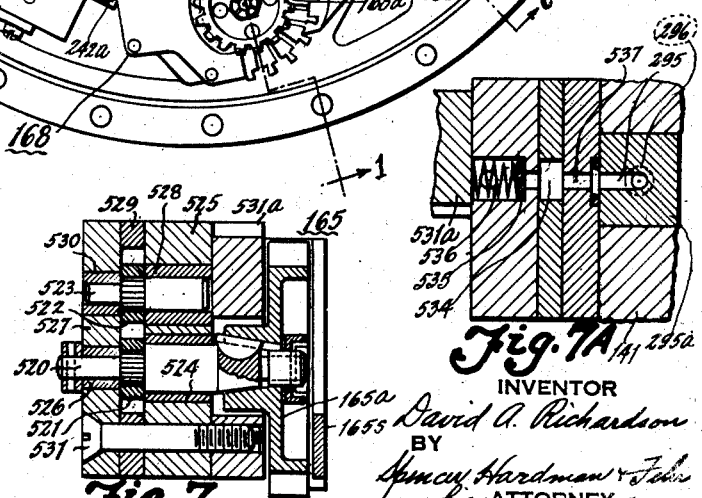

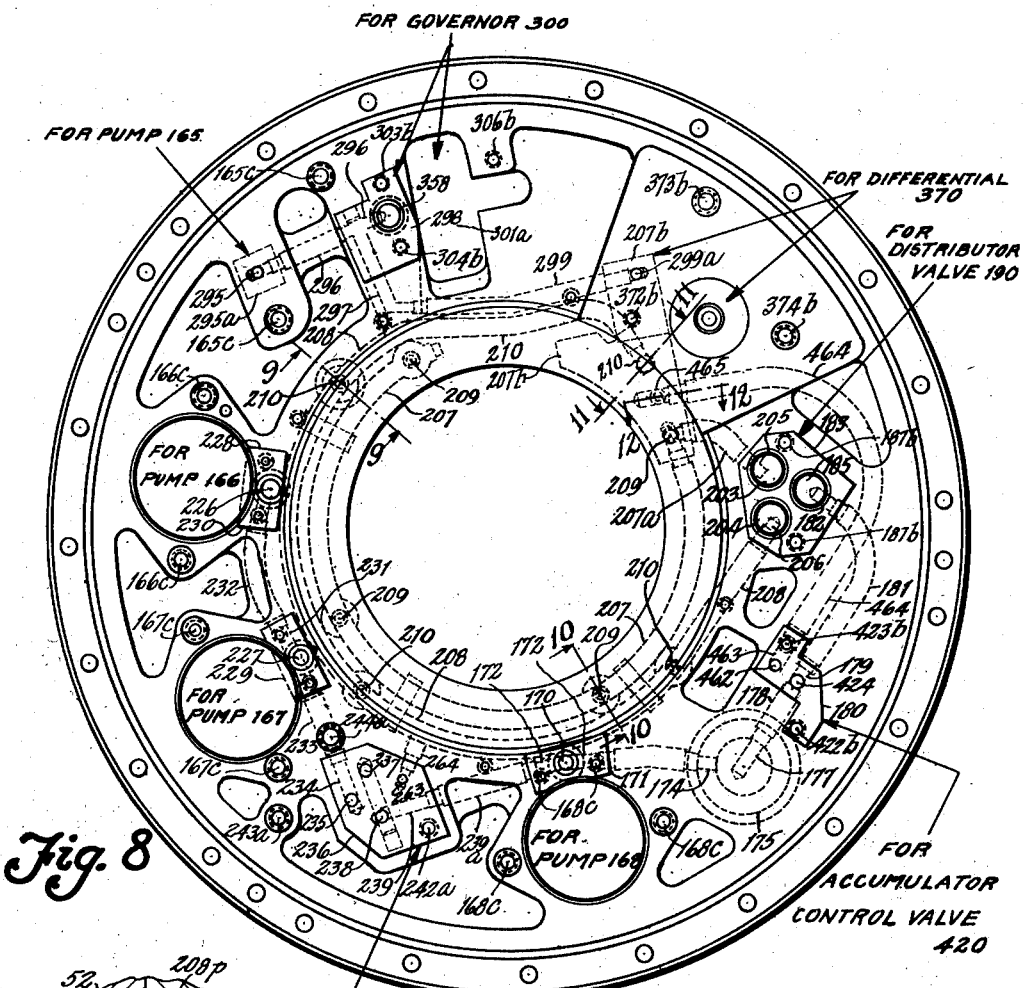

Oct. 7, 1952 D. A. RICHARDSON 2,612,958
HYDRAULICALLY OPERATED ENGINE-PROPELLER CONTROL
Filed Aug. 30, 1945 8 Sheets-Sheet 4
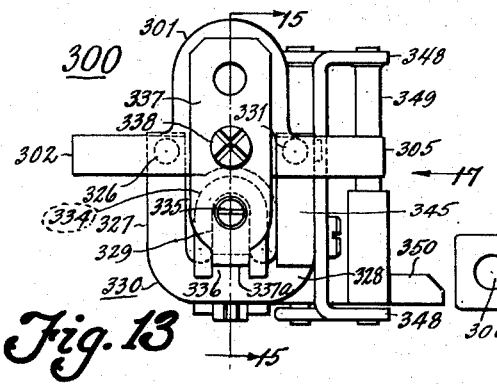
Fig. 13
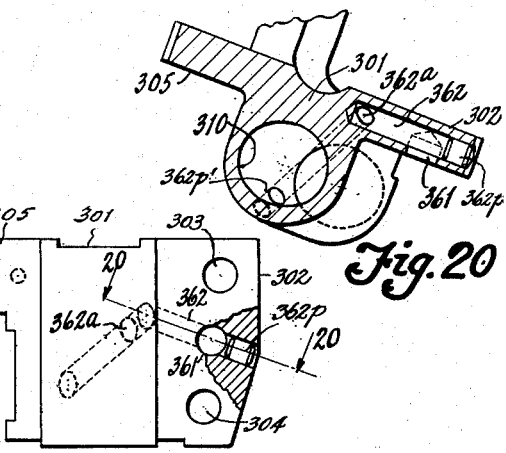
Fig. 20
Fig. 19
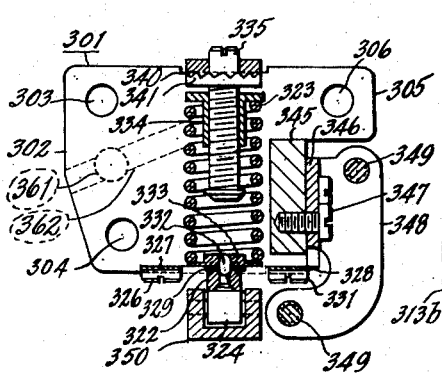
Fig. 14
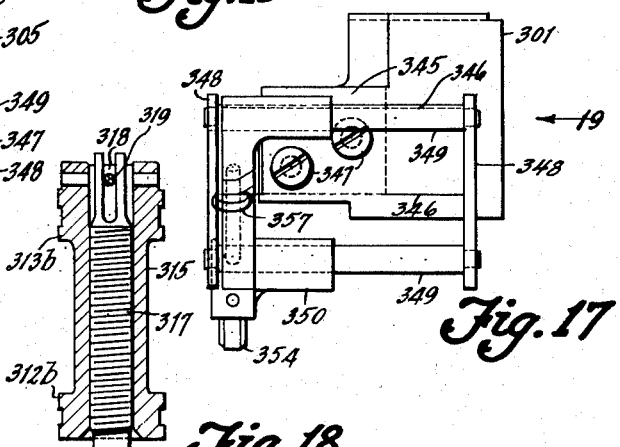
Fig. 18
Fig. 17
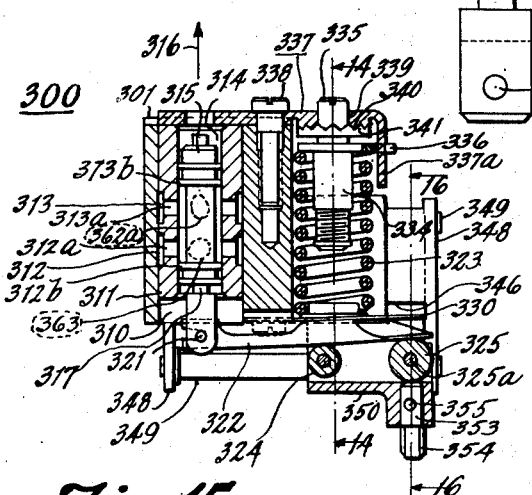
Fig. 15
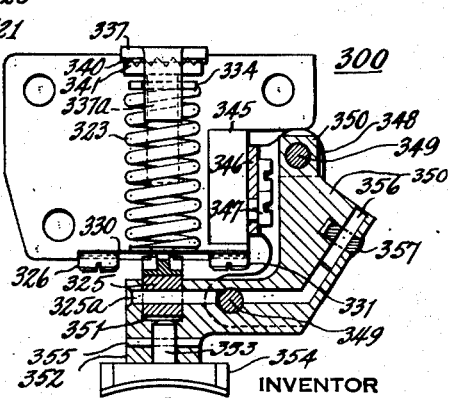
Fig. 16
INVENTOR
David A. Richardson
BY Spencer Hardman & Fehr
his ATTORNEY

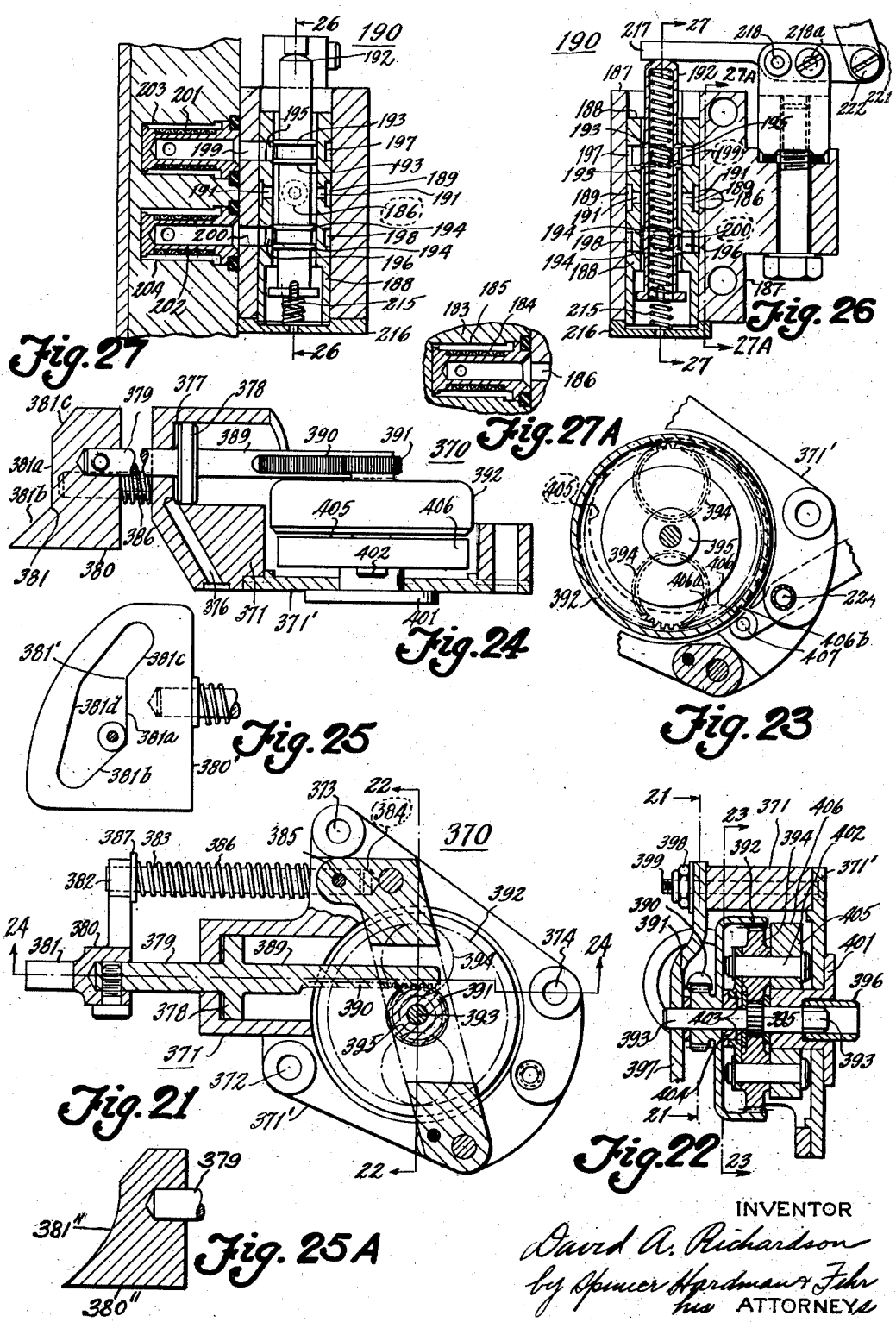

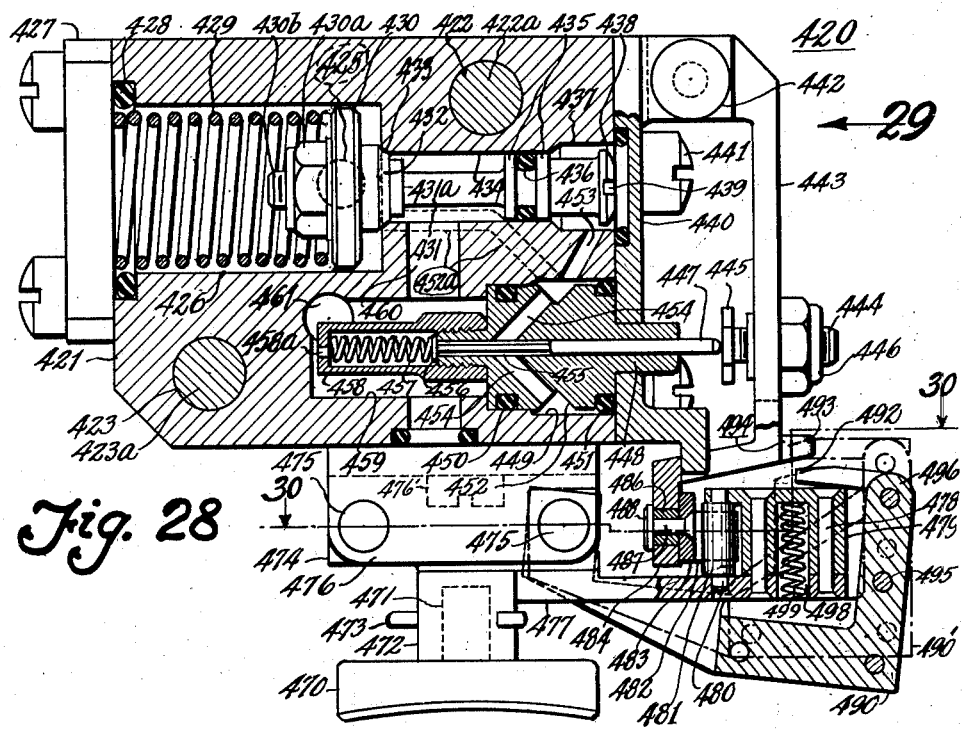
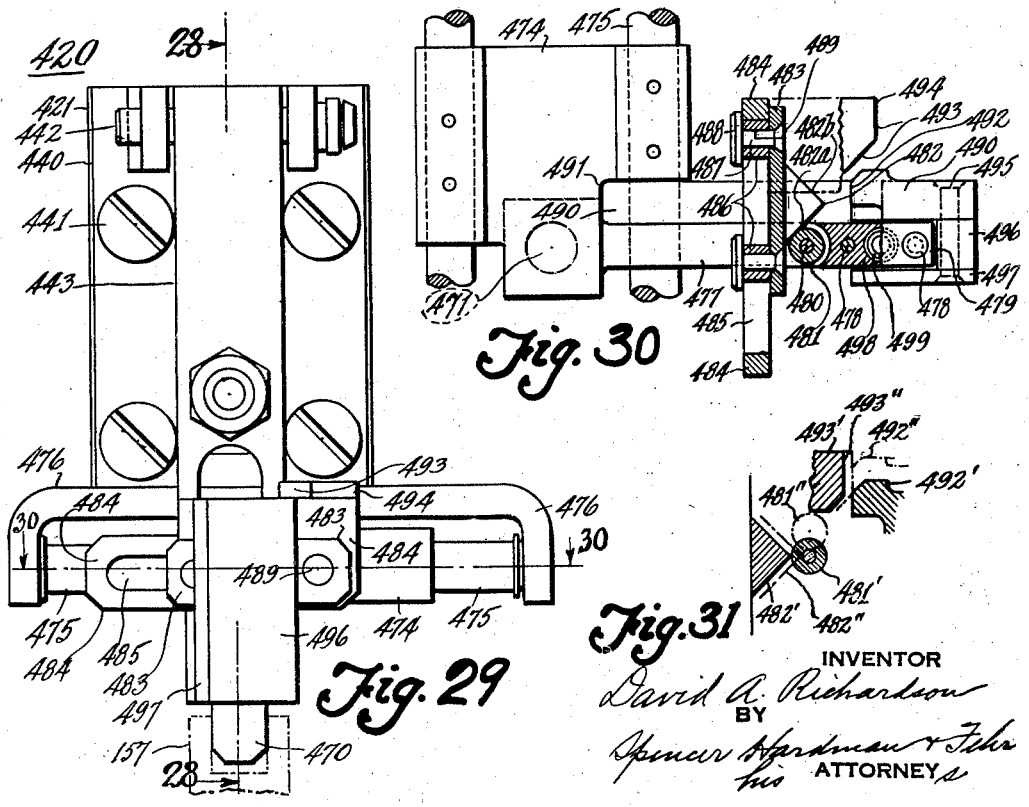

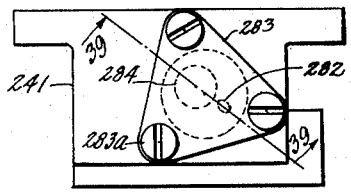
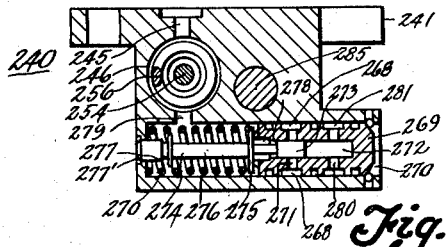
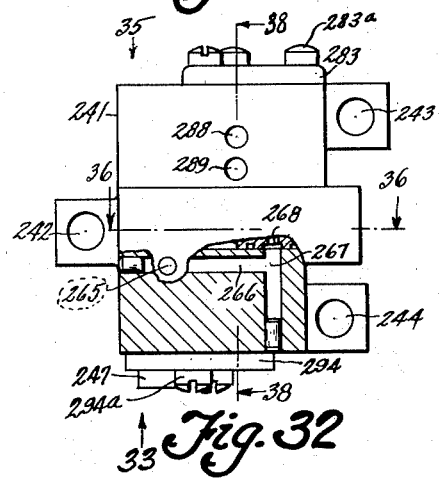
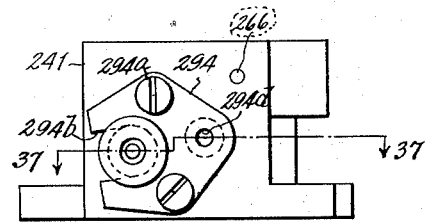
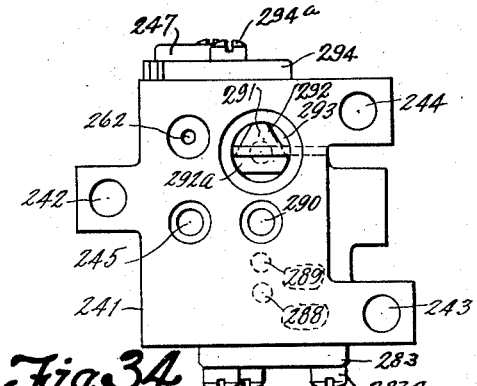
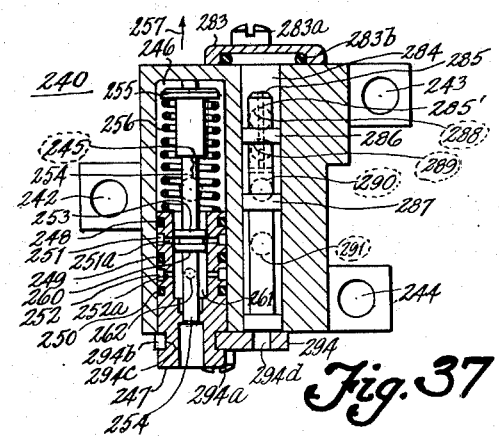
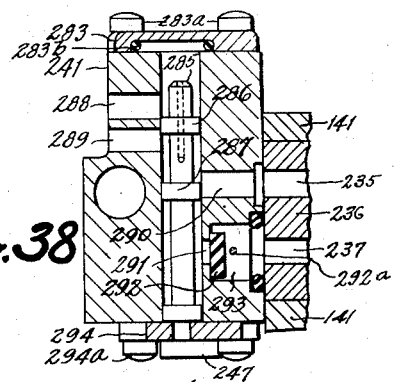
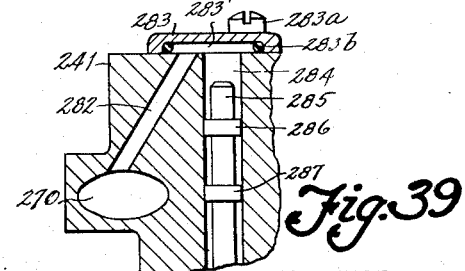

Oct. 7, 1952 D. A. RICHARDSON 2,612,958
HYDRAULICALLY OPERATED ENGINE-PROPELLER CONTROL
Filed Aug. 30, 1945 8 Sheets-Sheet 8
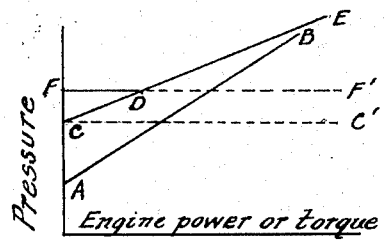
Fig. 41
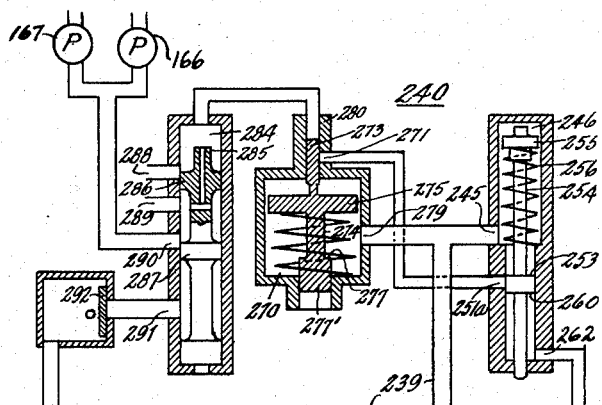
Fig. 40
Fig. 42
INVENTOR
David A. Richardson
BY
Spencer Hardman & Fehr
his ATTORNEYs Patented Oct. 7, 1952

2,612,958

UNITED STATES PATENT OFFICE 2,612,958

HYDRAULICALLY OPERATED ENGINE-PROPELLER CONTROL

David A. Richardson, Dayton, Ohio, assignor to General Motors Corporation, Detroit, Mich., a corporation of Delaware Application August 30, 1945, Serial No. 613,563

15 Claims. (Cl. 170—160.21)

This invention relates to a system of control for prime-mover-propeller power plants particularly for use in airplanes.

An object of the invention is to provide a system of control having speed responsive means for governing the speed of the prime-mover through automatic control of blade angle in order to maintain a manually selected speed while providing also for control of blade angle independently of the speed responsive means under certain conditions, namely: (1) under idling condition, when the speed responsive means may not have control of blade angle, positively to obtain a minimum blade angle required to maintain operation of the prime-mover; (2) under engine starting conditions, positively to obtain a blade angle requiring the least torque output to the propeller in order to facilitate starting and providing for maintenance of operation of the prime-mover when it becomes self-operative; (3) under conditions of low blade angle as may be required for braking in flight or during landing with maximum prime-mover speed (limited for example by an automatic fuel control), to provide for manual selection of a blade angle suitable for braking; (4) when taxying to provide manual control for forward motion of the airplane, for reverse or braking and for stopping; (5) under condition of failure of the speed responsive governor properly to limit blade angles in the higher range, manually to set the limits of high blade angles; (6) under condition of failure of the governor to obtain the high blade angle required for feathering, manually to condition the system to effect feathering independently of the governor.

In connection with the accomplishment of the foregoing objects, it is a further object to provide for minimizing the effect upon the speed responsive governor of the operation of hydraulically operated blade-angle-setting torque units which the governor controls. To this end, the present invention provides an hydraulic system for the governor independent of the hydraulic system for the torque units. The latter system includes a distributing valve for controlling the torque units for pitch increasing or decreasing functions. The distributing valve is under control by a differential mechanism responding to two movements, one movement being effective to demand a blade angle change and the other movement responding to blade angle change to restore the distributing valve to equilibrium status when the demand has been satisfied. The demanding movement is under control by the governor and by independent means which positively enforces or limits a demand under conditions mentioned in the preceding paragraph. More specifically the demanding movement is that of a servo-piston actuated in one direction by hydraulic pressure, controlled by a valve actuated by the governor, against opposition by a spring urging the piston in the opposite direction. The piston is connected with a cam which may cooperate with a manually positioned cam follower whereby, under the conditions mentioned heretofore as example, the travel of the piston in either direction may be limited or the piston may be forced to move by manual control.

The control of the demanding movement by the governor is substantially independent of operation of the torque units because change in blade angle does not have any appreciable effect on the flow rate or pressures at the governor-controlled valve. Since the hydraulic system directly controlled by the governor is separate from the hydraulic system of the torque units which require relatively high operating pressures and flows, the former system is not required to operate at torque unit operating pressures and flows; but it can operate at pressures and flows which are considerably lower than torque unit operating pressures. Hence the disturbing effect of high flow forces and pressures upon the governor controlled valve is minimized.

A further object of the invention is to provide for feathering and unfeathering. This is accomplished by a system of control which provides for selectively conditioning the distributor valve (through control by the governor or by manual control in case the governor fails) for making the feathering or the unfeathering connections between the pressure line and the torque units, and for conditioning the accumulator control valve for discharge of the accumulator in order to effect the selected feathering or unfeathering operation.

A further object is to provide a control system capable of operation either with or without the use of a propeller-pitch responsive governor.

Further objects and advantages of the present invention will be apparent from the following description, reference being had to the accompanying drawings, wherein a preferred embodiment of the present invention is clearly shown.

In the drawings:

Figs. 1 and 2 taken together constitute a longitudinal sectional view of a propeller hub and regulator assembly embodying the present invention, Fig. 1 being a sectional view taken, in general, on the line 1—1 of Fig. 3.

Fig. 3 is a sectional view on the line 3—3 of

Fig. 1. Fig. 3A shows a modification of Fig. 3.

Figs. 4, 5, 6, 7 and 7A are sectional views taken, respectively, on lines 4—4, 5—5, 6—6, 7—7 and 7A—7A of Fig. 3.

Fig. 8 is a plan view of the regulator mounting plate without the instruments shown in Fig. 3 mounted thereon.

Figures 1, 2:
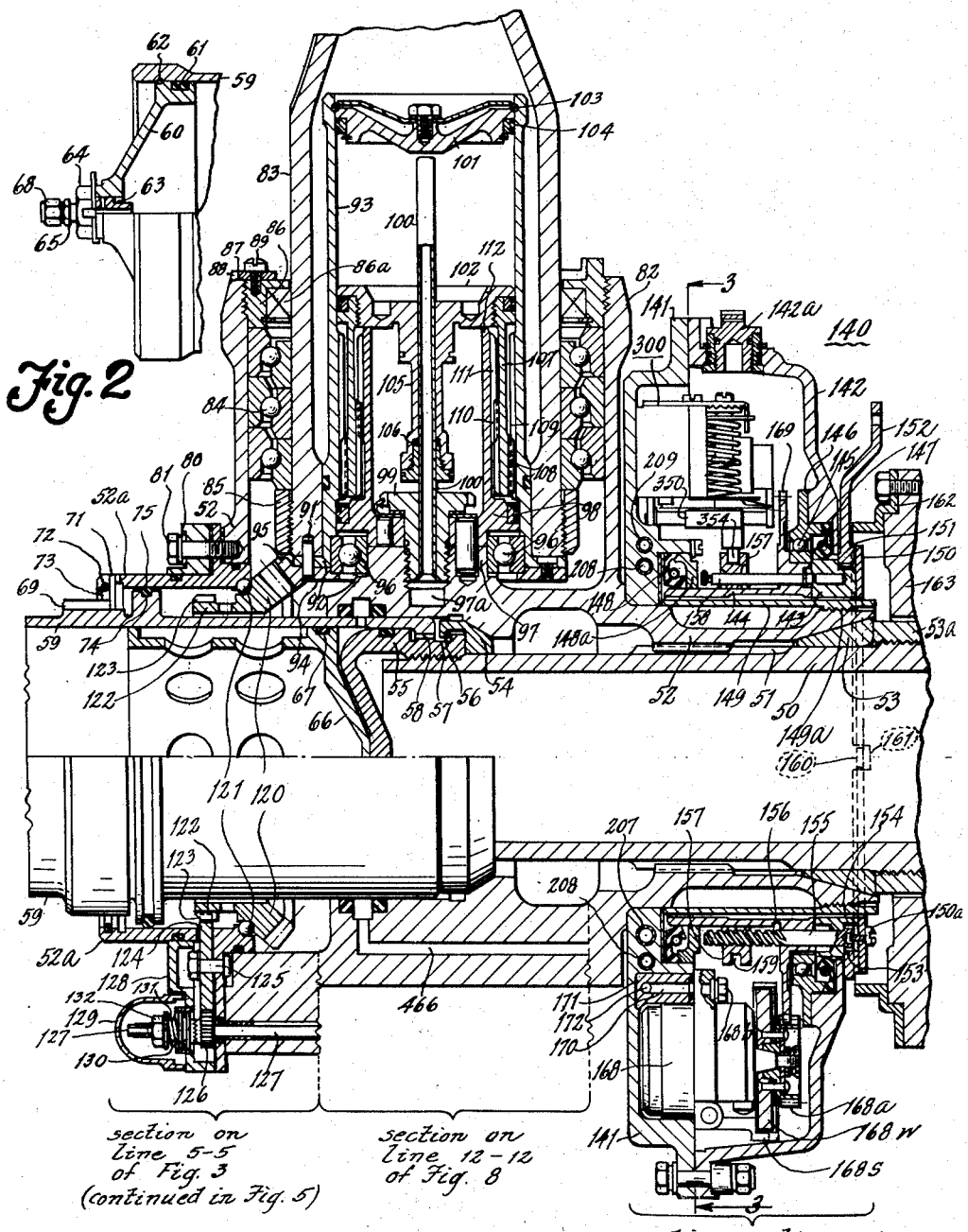

Figs. 9, 10, 11 and 12 are sectional views, taken respectively, on the lines 9—9, 10—10, 11—11 and 12—12 of Fig. 8.

Fig. 13 is a view of the governor shown in Fig. 3, said view being taken in the direction of the arrow 13 of Fig. 3.

Fig. 14 is a sectional view on the line 14—14 of Fig. 15.

Fig. 15 is a sectional view on the line 15—15 of Fig. 13.

Fig. 16 is a sectional view on the line 16—16 of Fig. 15.

Fig. 17 is a side view in the direction of the arrow 17 of Fig. 13.

Fig. 18 is a sectional view of a valve shown in Fig. 15, said view being twice the scale of Fig. 15.

Fig. 19 is a view, in the direction of the arrow 19 of Fig. 17, of the governor valve body.

Fig. 20 is a sectional view on the line 20—20 of Fig. 19.

Fig. 21 is a sectional view of the differential mechanism 370 shown in Fig. 3, Fig. 21 being taken on the line 21—21 of Fig. 22.

Fig. 22 is a sectional view on the line 22—22 of Fig. 21.

Fig. 23 is a sectional view on the line 23—23 of Fig. 22.

Fig. 24 is a sectional view on the line 24—24 of Fig. 21.

Figs. 25 and 25A are modified forms of cam 381 of Fig. 24.

Fig. 26 is a sectional view on the line 26—26 of Fig. 27 of the distributor valve 190.

Figs. 27 and 27A are sectional views taken, respectively, on the lines 27—27 and 27A—27A of Fig. 26.

Fig. 28 is a sectional view on the line 28—28 of Fig. 29 of the accumulator control valve 420.

Fig. 29 is a view in the direction of the arrow 29 of Fig. 28.

Fig. 30 is a sectional view on the line 30—30 of Figs. 28 and 29.

Fig. 31 is a view similar to Fig. 30 showing certain parts in other positions.

Fig. 32 is a plan view, partly in section, of the flow control valve 240.

Fig. 33 is a view in the direction of the arrow 33 of Fig. 32.

Fig. 34 is a view in the direction of the arrow 34 of Fig. 33.

Fig. 35 is a view in the direction of the arrow 35 of Fig. 32.

Fig. 36 is a sectional view on line 36—36 of Fig. 32.

Fig. 37 is a view in the direction of the line 37—37 of Fig. 33.

Fig. 38 is a sectional view on the line 38—38 of Fig. 32.

Fig. 39 is a sectional view on the line 39—39 of Fig. 35.

Fig. 40 is an hydraulic circuit diagram.

Figs. 41 and 42 are charts illustrating certain functions of the system.

Referring to Fig. 1, 50 designates a tubular engine driven shaft having external splines 51 mating with internal splines provided by a propeller hub 52. Hub 52 is clamped between rings 53 and 54 of wedge-shaped cross section, ring 53 being retained by a thrust nut 53a and ring 54 being forced axially toward ring 53 by a nut 55 threaded on the left end of shaft 50 engageable with ring 54. Ring 54 of two half-pieces has an internal flange 56 received by an annular groove 57 of the nut 55. Therefore the unscrewing of the nut 55 will cause ring 54 to be moved left out of engagement with the hub 52. Nut 55 is connected by splines 58 with an accumulator cylinder 59 which extends a substantial distance beyond the left end of hub 52 and receives a cap 60 (Fig. 2) sealed by packing ring 61 and retained by snap ring 62. The central opening 63 in the cap 60 is closed by a plug 64 through which extends a valve 65 such as used in pneumatic tires. Through this check valve 65, gas is forced under pressure within the chamber between the cap 60 and a piston 66 slidable within the cylinder 59 and sealed by a packing ring 67. When the accumulator has been loaded with gas under pressure, the valve 65 is covered by a cap 68. The turning of the nut 55 is effected by turning the cylinder 59 by means of a spanner wrench having internal splines to fit the external splines 69 of the cylinder 59. The cylinder 59 is locked in position by a plate 70 having internal splines engaging splines 69 and having tangs 71 received by certain ones of a plurality of notches 72 in the end of a hub extension 52a. A snap ring 73 retains the plate 70. The groove 74 of cylinder 59 receives packing ring 75 which prevents the escape of lubricant from chamber 76 between hub extension 52a and cylinder 59. Hub extension 52a is secured to hub 52 by a clamping ring 80 through which screws 81 pass which are threaded into the hub 52.

Hub 52 provides tubular portions 82 each extending radially of the engine shaft axis and each receiving the root 83 of a propeller blade. Each root 83 is retained by a plurality of angular-contact bearings 84 located between a nut 85 threaded on the inner end of root 83 and a nut 86 threaded into the tubular portion 82 and retained by a key 87 fitting into a notch 88, and being secured to ring 86 by a screw 89. Ring 86 supports a seal ring 86a.

Each blade root 83 is connected by pins 91 with the flange 92 of a cylinder 93 and with a plate 94 providing a bevel gear segment 95. Cylinder 93 and plate 94 are supported by ball bearing 96 which is supported by a pad or boss 97 of the hub 52 and which is retained by a plate 98 attached to pad 97 by a bolt 99 which threadedly engages the pad 97 and which has a tubular shank through which extends a tube 100 leading from a recess 97a to the space in the upper end of the cylinder 93 between a cap 101 and a piston 102. Cap 101 is retained by a snap ring 103 and is sealed at 104. Piston 102 is provided centrally with a tubular extension 105 surrounding the tube 100 and provides a packing gland 106 fitting around the tube 100. Piston 102 is threadedly connected with a sleeve 107 which is exteriorly helically splined at 108 to mate with interior helical splines 109 of cylinder 93. Sleeve 107 is interiorly helically splined at 110 to mate with external helical splines 111 of a sleeve 112 extending upwardly from the plate 98. As piston 102 moves radially of the hub 52, it turns relative to sleeve 112; and the cylinder 93 is caused to turn relative to piston sleeve 107 and to the stationary sleeve 112. In this way radial movements of the piston effect rotary movements of the blade roots, substantially as disclosed in Patent #2,307,101, Blanchard et al.

The blade roots 83 are rotatively tied together by a master bevel gear 120 supported by a ball bearing 121 supported by hub extension 52a. Gear 120 has a tubular hub 122 surrounding the accumulator cylinder 59 and providing a gear 123 meshing with an idle gear 124 supported by a stud or stub shaft 125 supported by hub extension 52a as shown in the lower left hand portion of Fig. 1. Gear 124 meshes with a pinion 126 which drives a shaft 127 for a purpose to be described. Gears 124 and 126 are enclosed by a plate 128 to which is attached a cover 129 for the left end of shaft 127. Pinion 126 is not directly attached to the shaft 127 but has clutch-tooth engagement with a disc 130 longitudinally splined to shaft 127 and urged toward the pinion 126 by a spring 131 which is retained by a nut 132 threaded on the shaft 127. The connection between pinion 126 and disc 130 being susceptible of adjustment upon loosening of nut 132, the shaft 127 can be properly timed relative to the master gear 120.

The regulator assembly is designated in its entirety by numeral 140 in Fig. 1. The instruments of the regulator are enclosed within a housing provided by a plate 141 and a cover 142 which are rotatable with the hub, and by rings 143 and 144 which are non-rotatable. Ring 144 supports the inner race of a ball bearing 145, the outer race 146 of which is attached to cover 142. A seal 147 is located between ring 143 and cover 142. A seal 148 is located between ring 144 and plate 141 and is supported by a ring 148a fixed to plate 141 and surrounding ring 144, for which ring 148a may provide a bearing. Assembly 140 is retained on the hub 52 by a sleeve nut 149 threadedly engaging the hub at 149a and engaging plate 141. A plate 150 is attached to ring 143 and retains a ring 151 having a handle 152 and providing an internal or ring gear 153 engageable with a plurality of pinions 154 each connected with a shaft 155 having a screw 156 threaded into a ring 157, surrounding ring 144 and guided by studs 158 supported by ring 144 and providing locating dowels for ring 143. Ring 157 has an annular groove 159 for a purpose to be described. Screws 150a secure together the rings 150, 143 and 144. Rotation of lever 152 and ring 151 effects axial movements of ring 157 which does not rotate with the propeller hub, because ring 150 is provided with a tang 160 engaging a notch 161 in a plate 162 attached to the engine frame 163.

The regulator assembly 140 rotates around the ring 157 and any manual control of instruments of the regulator must be effected through connections of the groove 159 of the ring 157. As shown in Fig. 3, the regulator includes several pumps 165, 166, 167 and 168 whose shafts are driven respectively by gears 165a, 166a, 167a and 168a, all meshing with a stationary gear 169 integral with or connected with the fixed ring 144. The inlets of these pumps are all connected with a source of hydraulic liquid or oil contained in the reservoir provided by the plate 141 and cover 142, the rotating level of the liquid being such that at least the inlets to the pump impeller wheels (such as 168w) are submerged. Pump impeller wheels for feeding oil to the pump inlets are necessary when the accumulator is supplied with oil from the reservoir of the unit 140; and the filling of the accumulator with oil under pressure materially drops the rotating oil-level in the reservoir. The reservoir is filled through an opening at the top in Fig. 1 which will be closed by plug 142a.

Fig. 1 shows pump 168 which is like pumps 166 and 167. It is connected by screws 168b in the plate 141, said screws being threaded into tapped holes 168c (Fig. 8). Its outlet is connected with a hole 170 in a pad 171 which is an insert in the casting of which plate 141 is made. Hole 170 leads to hole 172 in pad 171. Pressure oil discharged by pump 168 flows through passage 172, pipe 173 connected with a passage 174 in a pad 175 which receives a filter 176 (Fig. 6) whose inlet is connected with passage 174 and whose outlet is connected with passage 177 connected by pipe 178 with passage 179 of pad 180 connected by a pipe 181 with passage 182 of pad 183. Passage 182 leads to a filter 184 (Fig. 27a) located in the recess 185. The outlet of filter 184 is connected with passage 186 in block 187 of distributing valve 190 (Figs. 26 and 27). Block 187 supports a valve cylinder 188 having an annular groove 189 connected with passage 186 and having radial passages 191 connected with the space within the cylinder 188 and surrounding a valve stem 192 having lands 193 and 194 for controlling ports 195 and 196 respectively connected with grooves 197 and 198 respectively connected with passages 199 and 200 respectively which, as shown in Fig. 27, are connected with the interiors of filters 201 and 202 respectively, located in recesses 203 and 204 respectively and connected with passages 205 and 206 (Fig. 8) respectively connected with pipes 207a-207 and 208 respectively. Pipe 207 makes connections with branch passages 209 (Fig. 10) each leading to one side of the piston of a torque unit for decreasing pitch; and passage 208 is connected with branch passages 210 (Fig. 9) each leading to the pitch increasing side of the piston of each torque unit. Fig. 11 shows how a connection between pipe 208 and one of the passages 210 is made through an insert pad 207b. Valve stem 192 (Figs. 26 and 3) is urged toward a lever 217 by a spring 215 contained within the stem 192 and confined by a plate 216 attached to the valve body 187. Stem 192 is moved down by a lever 217 pivoted either at 218 or 218a (as shown in Fig. 26) by a screw 219. Lever 217 is connected by a screw 222 with a link 221 connected by a screw 222 with a lever 223 pivotally supported at 224 (Fig. 3) and actuated in a manner to be described later.

Pump 168 has a capacity sufficient for operation of the torque units at a moderate rate. When extra fast operation of the torque units is required, the flow rate to the torque units is boosted by the output of pumps 166 and 167, whose outlets are connected respectively with passages 225 and 227 of pads 228 and 229 having passages 230 and 231 respectively connected by pipe 232. Passage 231 is connected by pipe 233 with passage 234 and hole 235 in pad 236 which has holes 237 and 238 connected by cross passage 239 and a pipe 239a connected with passage 172 of pad 170. The control of the flow of oil from the hole 235 to the passage 239 is obtained by a flow control valve unit 240 which will now be described with reference to Figs. 32 through 39.

*Flow control valve unit*

The flow control unit 240 comprises a valve block 241 having apertured lugs 242, 243, 244 adapted to be secured to plate 141 by screws 242a, 243a, 244a (Fig. 3), respectively, received by tapped holes 242b, 243b, 244b, respectively, (Fig. 8). Block 241 provides a passage 245 aligned with hole 238 connected with passage 239. Passage 245 leads to a valve cylinder 246 which receives a valve cylinder or guide 247 having packing grooves 248, 249 and 250 and having oil passage grooves 251 and 252 connected by radial port holes 251a and 252a with the interior of the guide 247. The port holes 251a are controlled by a land 253 of a valve stem 254 attached to a head 255. Between the head 255 and the valve guide 247 there is located a control spring 256. Valve stem 254 is under control by centrifugal force acting in the direction of arrow 257 and by the spring 256 acting in the same direction. These forces are opposed by fluid pressure entering at 245 and acting upon the upper side of valve land 253. The stem 254 provides a flange or land 260 against which pressure fluid operates in the cylindrical space 261 below the land 260. This space 261 receives oil pressure through a passage 262 opening into the bottom of the block 241 as shown in Fig. 34. Passage 252 is connected with passage 263 in pad 236 connected by passage 264 with increased pitch passage 208. The pressure in cylinder 246 is effective upon an area whose diameter is the diameter of land 253. Any pressure in cylinder 261 is effective upon an area equal π/4 times the squared diameter of land 260 less the squared diameter of rod 254 below land 260. Therefore when the increased pitch line 208 is carrying the pressure fluid, there will be a tendency for stem 254 to move upwardly toward a position for blocking the ports 251a. Normally the valve blows off at various pressures increasing with increase of resistance to blade angle change.

The pressure fluid released by blow-off, is discharged through holes 251a, the groove 251 and thence through hole 265 (Fig. 32), passage 266, passage 267 to groove 268 in a valve guide 269 located in a bore 270. Groove 268 is connected by holes 271 with the bore 272 of valve guide 269, said bore receiving a piston valve 273 attached to a stem 274 carrying a plate 275 against which a spring 276 acts to urge the stem 274 toward the right. Stem 274 has an annular flange 277 of greater area than the flange 278 where the stem 274 joins the piston valve 273. The bore 270 is connected by a passage 279 with the cylinder 246 of the pressure control valve. When a certain minimum pressure obtains in the bore or cylinder 270, the differential of the pressures acting on flanges 277 and 278 will overcome the spring 276 whereupon the valve 273 will move left to uncover the ports 271 and pressure fluid will flow out the holes 280, the annular groove 281, the bore 270 which, as shown in Fig. 39, is connected by passage 282 with a cavity 283' in a cover plate 283 and communicating with the upper end of the cylinder 284 of the pump control valve thereby exerting pressure against land 286 provided by valve stem 285. Some of this pressure escapes through drain hole 288 (Figs. 32, 37 and 38). Land 286 is above drain hole 289 which, as shown in Figs. 37, 38 and 40, is connected with passage 290 connected with passage 235. Therefore, the pumps 166 and 167 connected with hole 235 (Fig. 8) will be connected with drain and they will not be operating under pressure. This condition exists when the torque units do not absorb the full capacity of the pump 168. When the torque units absorb the full capacity of pump 168, pressure in cylinder 246 drops and blow-off of the pressure control valve ceases because valve land 253 will move up in Figs. 37 and 40 under the action of centrifugal force exceeding the force of pressure upon land 253 to block port 251a. Blow-off pressure which had been in the cylinder 284 above land 286 leaks out through passage 285'. Therefore, under the action of centrifugal force exceeding pressure above valve 285, valve 285 rises to block the drain 289 of pumps 166 and 167 and to connect ports 290 and 291 (Fig. 38). Therefore, the output of pumps 166 and 167 flows past the check valve 292 into the valve-retaining recess 293 and through hole 237 and through passage 239, so that the combined output of pumps 166, 167 and 168 is effective to operate the torque units at the desired rate. (Normally check valve 292 would be held against its seat by the pressure from pump 168.)

When pressure fluid is flowing from the distributor valve 190 to the pitch increasing duct 208 (Fig. 8) pressure is applied through hole 262 to cylinder 261 (Fig. 37) thereby adding a force tending to move valve rod 254 upward. This has the effect of limiting blow-off pressure to a value only slightly greater than the requirements.

The cap 283 is sealed by ring 283b and secured by screws 283a. The valve 285 is retained by a plate 294 secured by screws 294a and having a notch 294b received by a groove 294c in the pressure control valve guide 247 thereby retaining the same in position.

Pump 165 is attached to plate 141 by screws 165b received by tapped holes 165c (Fig. 8). Its gear 165a (Fig. 3) drives a shaft 520 (Fig. 7) carrying a gear 521 meshing with a gear 522 carried by shaft 523. Shaft 520 is journaled in bearings 524 and 526 provided by plates 525 and 527 respectively; and shaft 523 is journaled in bearings 528 and 530 provided by plates 525 and 527 respectively. A housing for gears 522 and 523 is provided by plates 525 and 527 and an intermediate plate 529, said plates being secured together by screws 531 threaded into a plate 531a. Gear 165a, which rotates clockwise in Fig. 3 against a shroud 165s, picks up oil from the regulator housing (provided by plate 141 and cover 142, Fig. 1) and pushes it into a pocket 532 (Fig. 3) whence it flows through passage 533 to the inlet of the gear housing. The gears 522 and 533 force the oil to the housing outlet 534 (Figs. 3 and 7A) which is connected with drain 536 through relief valve 535 and which is connected with hole 537 connected with passage 295 in pad 295a and with pipe 296, passage 297 in pad 298, pipe 299, hole 299a in pad 207b. The construction of the pumps 166, 167 and 168 is similar to pump 165 except that they are each provided with an impeller wheel fitting a shroud (such as wheel 168w and shroud 168s) for effecting movement of oil into a pocket (like 532 of pump 165) from which oil flows to the pump inlet. The outlet (537, Fig. 7A) of pump 165 is connected with a hole 295 in pad 295a connected by pipe 296 connected with passage 297 in pad 298 and connected by a pipe 299 with a hole 299a in a pad 207b. The pump relief valve 535 shown diagrammatically in Fig. 40 is built into the pump as shown in Fig. 7A.

The governor

The governor 300, Figs. 3 and 13 to 20, comprises a valve body 301 providing a wing 302 having holes 303 and 304 and a wing 305 having a hole 306. Holes 303, 304 and 306 receive screws 303a, 304a and 306a which are received by tapped holes 303b, 304b and 306b in plate 141 (Fig. 8). A part of the valve body 301 is received by a recess 301a of the plate 141. Valve body 301 has a bore 310 which receives a valve guide 311 having annular grooves 312 and 313 connected respectively with the central bore 314 of the guide by ports 312a and 313a. The ports 312a and 313a are controlled by the lands 312b and 313b respectively of a valve 315 which is urged upwardly by centrifugal force as indicated by arrow 316. Valve 315, Fig. 18, is threadedly connected with a rod 317 provided with a notch 318 in its upper end to receive a cross pin 319 by which the valve 315 can be locked in adjustment relative to the rod 317. Rod 317 provides a clevis 320 connected by pin 321 with a lever 322 urged downwardly by a spring 323 against a stop roller 324 or against an adjustable fulcrum roller 325. A screw 326 received by the wing 302 passes through the outside branch 327 of a W-shaped leaf spring member 330. The other outside branch 328 is secured by a screw 331 to the body 301. The center portion 329 is apertured to receive a stud 332 carried by lever 322 (Fig. 14) and which extends through a central opening in the spring retainer 333 against which the spring 323 bears. The upper end of spring 323 bears against the flange of a sleeve 334 through which a screw 335 is threaded. The sleeve 334 provides a notch 336 which receives a lug 337a of a plate 337 attached by screws 338 to the body 301. Plate 337 has an opening 339 for receiving screw 335. Surrounding the opening 339 the plate 337 provides a serrated flange 340 receiving similar serrations 341 of the flange of the screw 335. The adjustment of spring 323 is made by applying a screw driver blade to the upper end of screw 335. Turning the screw causes it to be cammed downwardly by the coaction of the serrations, thereby permitting its rotation. While the screw 335 is being turned, the sleeve or nut 334 is restrained from rotation by virtue of its engagement with the lug 337a of the plate 337. Therefore the nut 334 is caused to move axially when the screw 335 is turned. The screw 335 is retained in the desired position of adjustment by the serrations 340 and 341 which are held in engagement by the spring 323.

Body 301 provides a mounting pad 345 against which the bracket yoke 346 is secured by screws 347. The yoke 346 is integral with two wings 348 which support parallel rods 349 along which a carriage 350 is guided. Carriage 350 has a channel shaped portion 351 for receiving the rollers 324 and 325 against which the lever 322 bears. Carriage 350 provides an apertured boss 352 (Fig. 16) for receiving the shank 353 of a shoe 354 which is received by groove 159 of ring 157 (Fig. 1). Pin 325a supported by carriage 350 pivotally supports roller 325. Adjustment of the ring 157 axially causes movement of the carriage 350 horizontally as viewed in Fig. 15. Adjustment of the roller 325 horizontally varies the effect of spring 323 in opposing centrifugal force acting upon the valve 315. The carriage 350 provides a pin 356 passing through a roller 357 for engaging a cam 381 (Fig. 24) of a differential mechanism to be described.

Referring to Fig. 8, the passage 296 is connected with a recess 358 which receives a filter 359 (Fig. 4), the outlet 360 of which is connected through hole 361 (Figs. 4 and 20) and passages 362 and 362a with groove 313 (Fig. 15) of valve guide 314. Groove 312 is connected with drain through passage 363. Plugs 362p close the outer ends of the drill holes for the passages 362 and 362a. In the normal operating status of the governor 300, the valve 315 is so positioned as to partially close the drain ports 312a. When the speed is greater than that which would balance the effect of spring 323, valve 315 moves up to decrease the opening of the drain ports 312a. When the speed is less than that which balances the effect of spring 323, the valve 315 moves down to increase the opening of the drain ports 312a. This produces an effect upon the differential mechanism which will now be described.

*Differential mechanism*

The differential mechanism 370 shown in the upper right portion of Fig. 3 and in Figs. 21 through 25 will now be described.

The mechanism comprises a plate 371' having holes 372, 373 and 374 through which pass screws 372a, 373a and 374a received by holes 372b, 373b and 374b in plate 141 (Fig. 8). To the plate 371' there is attached a body 371. The hole 299a through which pressure fluid may be forced from the pump 165 under certain conditions connects with passage 376 in body 371 leading to a cylinder 377 containing a piston 378 having a rod 379 having its left end connected with a bracket 380 which provides a cam 381 with which roller 357 of the governor 300 may cooperate. Bracket 380 has a lug 382 which is notched to receive a rod 383 received by a socket 384 in body 371 and retained therein by pin 385. A spring 386 surrounding the rod 382 presses against the body 371 and a washer 387 which bears against the bracket lug 382 to urge the piston 378 toward the left thereby resisting fluid pressure which may urge it toward the right.

The piston 378 has a rod portion 389 providing a rack 390 which meshes with a gear 391 connected with ring gear 392 loosely journaled on shaft 393. Ring gear 392 meshes with planet gears 394 meshing with sun gear 395 fixed to shaft 393. A coupling 396 connects shaft 393 with shaft 127 (Fig. 5) operated by the master bevel gear 120 (Fig. 1) and therefore rotating during a change in blade angle. Shaft 393 is rotatably supported by a strap 397 attached by nuts 398 and screws 399 to body 371 and to plate 371' which supports a bearing bushing 401 for shaft 393.

The planet gears 394 are rotatable upon pins 402, the left ends of which are supported by a ring 403 carrying a bearing bushing 404 supported by shaft 393. The right end portions of pins 402 are supported by a cam plate 405 rotatably supported by the bearing bushing 401. The outer peripheral surface of the plate 405 provides a cam 406 having its low dwell at 406a (Fig. 23) and rising to a high dwell 406b through a small angle.

Cam 406 engages a follower roller 407 on lever 223 (Fig. 3) and is urged toward the cam by the spring 215 which is within the valve stem 192 of the distributor valve 190 (Fig. 26). As will be explained later, the distributor valve is under the control of cam 406 which is under the control of torque units (acting through the master bevel gear 120 and plain gear 123 and shaft 127 and shaft 393, sun gear 395 and planet gears 394) and under control either by the cam 384 or by the servo-motor of the differential, the piston of which has a controlling effect on cam 406 through the rack 390, the gear 391, ring gear 392 and planet gears 394.

*Accumulator control valve*

The present system provides for control in the positive and negative pitch ranges and for feathering. The accumulator control valve 420 will now be described with reference to Figs. 3 and 28 through 30. The valve unit 420 has a body 421 providing holes 422 and 423 to receive screws 422a and 423a which are received by tapped holes 422b and 423b in insert pad 180 of plate 141 (Fig. 8). Passage 179 of pad 180 is connected with hole 424 connected with hole 425 in body 421 connected with cylinder 426 closed by a cover 427 sealed at 428, Fig. 28. Cylinder 426 receives a spring 429 bearing against a piston 430 attached to a valve stem 431 and having a frustro-conical valve portion 432 adapted to engage a similar formed seat 433 provided at the shoulder between the larger cylinder 426 and a smaller cylinder 434. Cylinder 434 cooperates with a piston provided by flanges 435 of valve stem 431 with packing 436 between the flanges. Cylinder 434 merges with an enlarged cylindrical portion 437 for receiving the head 438 of stem 431, said head having a screw driver slot 439 for receiving a screw driver blade in order to hold the valve rod 431 stationary while turning the nut 430a screwed on the end 430b of the rod in order to clamp the piston 430 against the flange 431a of the rod. The right end of the cylinder 437 is closed by a bracket 440 attached by screws 441 and providing a pivot at 442 for a lever 443 into which is threaded a screw 444 having a hex head or pad 445 and secured in the desired position of adjustment relative to the lever 443 by a self-locking nut 446. The pad 445 is adapted to engage a valve operating rod 447 slidable through a bushing 448 located in a recess 449 and sealed by rings 450 and 451. A V-annular groove 452 of the bushing 448 is connected by passage 452a with cylinder 426, by passage 453 with cylinder 437 and by passages 454 with a bore 455 through which rod 447 extends, the left portion of the rod being less in diameter than the right portion so that a passage around the left portion and along bore 455 is provided, said passage being connected with passages 454 and being normally closed by a check valve 456 which is urged against its seat provided by the left end of bushing 448 by a spring 457 retained by a sleeve 458 screw threadedly engaging the bushing 448. Sleeve 458 is provided with a hole 458a. The sleeve 458 is located in a chamber 459 which is connected with cylinder 434 by passage 460 and which is connected with a passage 461 which is connected with hole 462 (Fig. 8) in insert pad 180 which is connected with passage 463 connected by pipe 464 with passage 465 connected by a longitudinally extending passage 466 (Figs. 12 and 1) leading to the accumulator.

The accumulator is charged through the following circuit of the control valve unit 420: Hole 424 of insert pad 180 (Fig. 8), passage 425 of valve body 421, passage 452a, passage 454, bore 455, out through check valve 456, sleeve 458, sleeve outlet 458a, hole 461, hole 462, passage 463, pipe 464, passages 465 and 466. Back pressure from the accumulator prevents discharge through this passage by closing the check valve 456.

If, at the time the discharge of the accumulator is required for the purpose of completion of feathering when pump pressure falls, the check valve 456 is opened, then the accumulator can first discharge back through passage 461, opening 458a in sleeve 458, bore 455, passage 454, passage 453 to cylinder 437, thereby causing the piston land 435 and rod 431 to move left in order to disengage valve 432 from seat 433 and thereafter to cause piston 430 to move further to the left to partially uncover the hole 425, whereupon the accumulator may discharge directly through passage 461, cylinder 459, passage 460, cylinder 434, cylinder 426, hole 425, hole 424 of pad 180 (Fig. 8), and pipe 181 leading to the distributor valve and thence to the torque units. When feathering is completed, the pressure differential on opposite sides of the piston 430 diminishes and permits the spring 429 to move the valve 432 against its seat 433 thereby preventing further discharge of the accumulator. For purposes of unfeathering, discharge of the accumulator can be effected by momentarily opening the check valve 456 by a movement of the rod 447.

The means for moving the rod 447 left to open the check valve 456 will now be described. This means is manually operated by movement of the grooved ring 157 into a feathering control position or into an unfeathering control position. For this purpose, the grooved ring 157 receives a shoe 470 having a shank 471 (Fig. 28) received by a bore in a tubular boss 472 and retained therein by pin 473. The boss 472 is integral with a carriage 474 which slides on rods 475 which are supported at their ends by a bracket 476 attached to the body 421 by screws 476'. Carriage 474 has an arm 477 to which rivets 478 attach a block 479 which together with the arm 477 supports a pin 480 supporting a roller 481 engageable with a triangular cam 482 having inclined faces 482a and 482b. Cam 482 is integral with a plate 483 which is slidable horizontally as in Fig. 29 along a portion 484 of lever 443. Portion 484 has a slot 485 for receiving spacers 486 (Fig. 30) through which there extend the shanks 487 of rivets having heads 488 slightly clearing the left face of the portion 484 as viewed in Fig. 30. These rivets are secured as shown to the plate 483 by riveting over at 489. Therefore, it is apparent that before any clockwise movement of the lever 443 can be effected through motion of the carriage 474 in either direction (up or down in Fig. 30), the lost motion between the plate 483 and the lever part 484 must be taken up. The lost motion is such as will permit of conditioning the distributor valve to make the proper connections for feathering or unfeathering in advance of conditioning the accumulator control valve unit for discharge of the accumulator for feathering or unfeathering.

It is desirable to effect movement of the carriage into the feathering control position in advance of the instant that feathering may be accelerated by flow from the accumulator. In order to make use of fluid energy stored in the accumulator, it is necessary not only to move the lever 443 left to open the valve 456, but also to hold the valve 456 open. This is necessary because, should the pump pressure be greater than the pressure available in the accumulator, the piston 430 will not move left sufficiently to uncover hole 425; and, therefore, sufficient time must elapse between time that the carriage 474 is moved to the feathering position and the time that piston 430 will have moved to uncover the hole 425 so that the system pressure will have dropped to a value less than the accumulator pressure as result of the blade angle becoming higher due to action of pump pressure, thereby reducing rotational speed. When pump pressure is down, the accumulator is ready to go into action because the valve 456 is already cocked. The valve unit 420 therefore provides a speed-responsive latch for holding the valve 456 in cocked position during the lapse of time referred to.

The speed-responsive latch is provided by lever 490 journaled on the right rod 475 and located in a notch 491 between the main portion of the carriage 474 and the extension 477. The lever 490 provides a latch surface 492 adapted to engage a latch surface 493 on the right end of a lug 494 of lever 443. The rest position of lever 490 is shown in full lines, and the normal operating position 490' due to centrifugal force, is in dot-dash lines. When lever 443 is moved left (Fig. 29) by the ring 157 into the feathering control position, roller 481 moves up to cam 482 as shown in Fig. 30 and then moves to position 480' (Fig. 31) to move the cam 482 into the position 482'. Latch surface 492 is then at 492' and latch surface 493 is at 493'. As roller 481 moves to the position 481" (Fig. 31), surface 493 moves under the action of spring 457 to 493" against the surface 492 then located at 492"; and the closing of valve 456 is prevented. Therefore valve 456 will be held open until conditions exist such that the accumulator can discharge in to the pressure system of the torque units.

In order to weight the free end of the lever 490, it is attached by rivets 495 to an L-shaped weight 496 and to a side plate 497. The horizontal part of the weight 496 stops against the lower side of the carriage extension 477. Centrifugal force is resisted by a spring 499 located in a cavity 498 provided by the block 479 and bearing against the horizontal portion of the L-shaped weight 496.

Because valve 456 had been previously opened, at the instant that pump pressure falls below accumulator pressure, the accumulator discharges through the bore 455, passage 454, the passage 453 and into cylinder 437 to cause the valve 432 to open, and the piston 430 to partially open port 425, thereby connecting the accumulator, through passages 461, 460 and 425, with the torque units for the feathering function. When propeller speed has diminished sufficiently, the spring 499 will overcome centrifugal force on weighted lever 490, thereby causing the latch surface 492 to fall below the latch surface 493, thereby permitting the spring 457 to move lever 443 right to its normal position and to move check valve 456 to close position. When feathering is complete, the valve 432 will be automatically closed due to decrease of pressure differential on both sides of the disc 430. The pressure-fluid remaining in the accumulator will be retained by virtue of the closing of check valve 456. When it is desired to come out of feathering, the carriage 474 is moved left in Fig. 29 to cause roller 480 to move down in Fig. 31. Roller 480 first engages the cam surface 482b thereby causing the plate 483 to move down until the lower spacer 486 (Fig. 30) engages the lower end of groove 485. Further movement of the carriage 474 down will cause the roller 480 to move the cam 482 left, thereby causing a momentary opening of the check valve 456 sufficient to effect opening of the valve 432, thereby causing the accumulator to be connected with the torque motor for purposes of unfeathering.

The lost motion connection between the cam plate 483 and lever 443 provided by the slot 485 in lever 443, provides for conditioning the distributor valve 190 for feathering or unfeathering at least as soon as the conditioning of the valve 456 for discharge of the accumulator.

Another feature of the accumulator control valve 420 is that in the space within cylinder 434 and between the left land 435 and the flange 431a and the valve 432, fluid pressure is balanced. Therefore accumulator pressure acting on these portions of the valve assembly, which includes rod 431, has no appreciable effect. When valve 456 is opened for the feathering operation, accumulator pressure acts on valve head 438 to open valve 432 and then the right face of piston is subjected to accumulator pressure also. Thus the effective area subjected to accumulator pressure is a circular area whose diameter is the diameter of piston 430. This pressure is opposed by spring 429 and pump pressure on the left side of the piston acting on an area which is the same as the area subjected to accumulator pressure. When the pressure differential increases to a value such as to overcome the spring force, the piston 430 moves left to permit discharge of the accumulator for feathering. When, upon completion of feathering, the pressure differential decreases to a value less than spring force, spring 429 closes valve 432. Since the pressure on valve surface 432 and flange 431a is substantially balanced by pressure on left flange 435, the action of spring 429 to close valve 432 is not opposed by accumulator pressure acting on said valve. Therefore spring 429 can be made lighter since it is required only to oppose a pressure differential with respect to equal areas whose diameter is the full diameter of the piston 430.

*Résumé of operation*

Fig. 40 shows diagrammatically the entire control system. Fig. 41 shows the operation of the flow control unit 240. Line A—B shows required torque unit pressures for increasing pitch corresponding to different values of engine power or torque. Line C—D—E shows available pressure for increasing pitch as provided by the pressure control valve of unit 240. Since the minimum pressure valve limits the "blow-off" of the pressure control valve, the minimum pressure available is not less than D, but follows line F—D. The purpose of the minimum pressure control is to obtain, under conditions of idling or warming up, a pressure sufficient to effect complete filling of the accumulator. When the minimum pressure control provided by valve 273 is not used, line C—C' indicates pressure available for pitch decreasing. When minimum pressure control is used, line F—F' indicates pressures available for pitch decreasing.

The adjustment of the governor to various governed speeds is represented in Fig. 40 as being effected by a manually operated lever 500 operating a horizontally movable member 501 supported by guides 501a and carrying the roller 325, the position of which determines the speed to be maintained by the governor 300. The member 501 corresponds to the carriage 350 of the governor 300 and to the carriage 474 of the accumulator control valve 420. The neutral or on-speed position of valve 315 in which land 312b partly covers the port 312a is a function of the position of piston 378, which is balanced between the force of spring 386 and the force of the pressure fluid in cylinder 377. In the neutral or on-speed position, that is, when the system is operating under governed pressure and the piston 378 is balanced or floating between the force of spring 386 and the pressure in cylinder 377, then the cam 381 may be spaced slightly from the roller 357 such that a variation in the balance of forces on the piston 378 effects corrective influence on the blade pitch through the racks and pinion shifting the cam 406' and thence the valve 192 for applying fluid pressure to the torque unit C.

Overspeed error causes valve 315 to move up to increase the closing of port 312a. Pressure in cylinder 377 of differential 370 increases to overbalance spring 386 (equivalent of 386, Fig. 21) and piston 378 moves down to move rack 392' (equivalent of ring gear 392, Fig. 21) down to rotate gear 394' (equivalent of planet gears 394, Fig. 22) counterclockwise while rack 395' (equivalent of gear 395, Fig. 22) remains stationary. Cam 406' (equivalent of cam 406, Fig. 23) moves down to cause distributor valve 192 to move right to connect the lower end of torque unit cylinder C with pressure thereby causing piston P to move up to increase the pitch of blades B, thereby increasing the torque required to rotate the propeller and reducing the engine speed. As piston P moves up, rack 395' moves up and causes upward movement of cam 406' which allows spring 215 to move valve 192 toward equilibrium position.

Underspeed error causes governor valve 315 to move down to increase the opening of port 312a, thereby reducing the pressure in cylinder 377 and permitting the spring 386 to move piston 378 up. This results in decrease of blade angle to permit increase of engine speed.

Under conditions of engine starting, roller 357 is so placed by lever 500 as to be contacted by surface 381a of cam 381. There being practically no pressure above piston 378, upward movement of the piston 378 by spring 386 is limited by engagement of cam surface 381a with roller 357. This limits the blade angle to a low positive value which requires the minimum torque absorption by the propeller in order to facilitate engine starting.

When engine starting is begun there is substantially no pressure of fluid from the pump 165 and in the channel 299' to the chamber 377, or it is so low that it has little or no opposing effect to the spring 386 for which reason the cam 381 is urged against the roller 357, but as soon as there is sufficient rotation of the propeller to create fluid pressure in the line 299' from the pump and the governor valve moves outward to restrict the port 312a the opposition to the spring 386 builds up and the cam 381 starts to move away from the roller 357 effecting a slight change in the blade adjustment through the racks, pinion and cam 406' with valve 192 for the engine idling conditions.

Under conditions of idling, after the engine becomes self-operative, the blade angle is limited by engagement of cam surface 381a with roller 357 to the low positive value sufficient to maintain operation of the engine, but the angle may in fact be greater than the low positive value since the operation of the governor 300 will control sufficiently to somewhat oppose the spring 386, thereby spacing the cam 381 from the roller 357 and slightly shift the valve 192 through the action of the rack bars and pinion. Thus in both engine starting and engine idling the cam face 381a marks the low limit to which the blade angle may be set, and still provides for adjustment of blade angle to a satisfactory higher angle as the conditions may require and within the provisions detailed by the curves of Fig. 42, later to be explained.

Control of governed speed is effected by movement of roller 325 left of the position shown in Fig. 40 to reduce governed speed or to the right to increase governed speed. Position 325' of the roller 325 is the position for maximum speed of the engine as limited, for example, by an automatic fuel control FC. When the roller 325 is at 325', roller 357 is at 357' in vertical alignment with the right end of cam surface 381a. Further movement of roller 325 to the right of 325' such as at 357'' for braking will not effect further increase of speed because the speed is limited by the automatic fuel governor. Therefore the governor spring 323 will move the valve 315 down further to open port 312a, and the governor loses control because the pressure in cylinder 377 is not sufficient to balance the spring 386. Piston 378 then moves up until cam surface 381b engages roller 357 at 357'' thereby determining the blade angle according to the position of roller 357 to the right of position 357'. Therefore, blade angle can be less, positively, than the value established by surface 381a and may extend into the negative pitch range according to the distance which roller 357 is moved right by lever 500. Therefore, a blade angle suitable for braking is obtained by manual control.

During normal governed speed of the propeller pump 168 has a capacity sufficient for operation of the torque units C at a moderate rate, and the system has little need for supplement from the booster pumps 166 and 167. There may be conditions during governed speed, such as sudden and considerable speed change coincident with change in craft attitude, that may require a greater supply of pressure fluid for the torque units that can be promptly supplied by the pump 168. During feathering, unfeathering, and shift of blade pitch for braking, which is a negative pitch setting, and during reverse shift from braking back to positive pitch or governed speed operation, there is created such demands on the fluid pressure supply for the torque units that the pump 168 is sooner or later incapable of supplying enough pressure to complete promptly the functions called for. In any of those conditions resulting in inadequate supply of fluid pressure by the pump 168 to promptly actuate the torque units C there is a decided fall of pressure in the fluid pressure line 239 which is not only manifest in the distributor valve 190 but is also present in the flow control valve unit 240. Pressure is low in the chamber 246 which permits centrifugal force and spring force to act upon valve stem 254 for closing port 251a, and pressure is also low in chamber 270 which reduces the differential on areas 277 and 278 so low as to be overcome by the force of spring 276 and permits the valve 273 to interrupt fluid flow through 271 to the chamber 284 of the pump control valve. Thus there is no drain back from the port 251a of the pressure control valve, and there is no fluid pressure in chamber 284 of the pump control valve to oppose the outward movement of valve stem 285. Outward shifting of the stem 285 operates to connect ports 290 from the pumps 166 and 167 with the port 291 which opens through the check valve 292 to the pressure source line 239. Thus, if there is any rotation of the propeller at the time that additional fluid pressure is called for it will be provided by the additional pumps as soon as the demand of additional pressure tends to reach the capacity of the pump 168. Coincidence of large fluid pressure demands and propeller rotation obtains during shift of blade pitch from positive range to negative for braking and reverse shift back to governed positive range, and generally during shift of blade pitch for feathering. During unfeathering shift at all times, and during feathersuit the requirements for simple manual control of blade angle or for control by other means. For example, Fig. 25A shows a plate 380'' on the end of rod 379 providing a cam 381'' which might suit a particular requirement. Control ring adjusting lever 152 (Fig. 1) could be manually operated to effect blade angle control through a cam such as cam 381'' or lever could be connected with some automatic controlling instrument.

While the embodiment of the present invention as herein disclosed, constitutes a preferred form, it is to be understood that other forms might be adopted, all coming within the scope of the claims which follow.

What is claimed is as follows:

1. In a system of control for an engine-propeller power-plant having hydraulically operated propeller-pitch adjusting apparatus, a pressure system for the apparatus and a pressure pump driven by the plant, the combination comprising, a distributing valve in the pressure system and connected with the pump for controlling pressure flow to the apparatus, a differential mechanism disposed between the pressure system and the pitch adjusting apparatus for controlling the distributing valve and having a first mechanism including a rack bar actuable by the pressure system and movable in response to a demand for propeller pitch adjustment and a second mechanism including a rack bar movable in response to operation of said apparatus to effect the demanded propeller pitch adjustment and having an element actuatable by both rack bars for controlling the distributing valve in response to the differential of the movements of said mechanism, a speed responsive governor valve open to the pressure system and operable upon the first said mechanism for controlling the demanding movement of the differential mechanism to effect a corrective propeller pitch adjustment when there is a deviation from a selected governed speed, and manually operable means actuating the governor valve for selecting the governed speed to be maintained.

2. In a system of control for an engine-propeller power-plant having hydraulically operated propeller-pitch adjusting apparatus, a pressure system for the apparatus and a pressure pump driven by the plant, the combination comprising, a distributing valve in the pressure system and connected with the pump for controlling pressure flow to the apparatus, a differential mechanism disposed between the pressure system and the pitch adjusting apparatus for controlling the distributing valve and having a first mechanism including a rack bar actuable by the pressure system and movable in response to a demand for propeller pitch adjustment and a second mechanism including a rack bar movable in response to operation of said apparatus to effect the demanded propeller pitch adjustment and having an element actuable by both rack bars for controlling the distributing valve in response to the differential of the movements of said mechanisms, a speed responsive governor valve open to the pressure system and operable upon the first said mechanism for controlling the demanding movement of the differential mechanism to effect a corrective propeller pitch adjustment when there is a deviation from a selected governed speed, manually operable means actuating the governor valve for selecting the governed speed to be maintained, and means including a part of said first mechanism operable under manual control for conditioning the differential, under engine starting and idling conditions, to obtain a certain propeller pitch adjustment suitable to facilitate the engine starting operation and to maintain operation of the engine during idling when control by the governor is unsatisfactory.

3. In a system of control for an engine-propeller power-plant having hydraulically operated propeller-pitch adjusting apparatus, a pressure system for the apparatus and a pressure pump driven by the plant, the combination comprising, a distributing valve in the pressure system and connected with the pump for controlling pressure flow to the aparatus, a differential mechanism disposed between the pressure system and the pitch adjusting apparatus for controlling the distributing valve and having a first mechanism including a rack bar actuatable by the pressure system and movable in response to a demand for propeller pitch adjustment and a second mechanism including a rack bar movable in response to operation of said aparatus to effect the demanded propeller pitch adjustment and having an element actuatable by both rack bars for controlling the distributing valve in response to the differential of the movements of said mechanisms, a cam member, a cam follower member engaging the cam member, one of said members being attached to a part of the first mechanism of the differential, and means for effecting a movement of the other member to effect a movement of said second mechanism.

4. In a system of control for an engine-propeller power-plant having hydraulically operated propeller-pitch adjusting apparatus, a pressure system for the apparatus and a pressure pump driven by the plant, the combination comprising, a distributing valve in the pressure system and connected with the pump for controlling pressure flow to the apparatus, a differential mechanism disposed between the pressure system and the pitch adjusting apparatus for controlling the distributing valve and having a first mechanism including a rack bar actuatable by the pressure system and movable in response to a demand for propeller pitch adjustment and a second mechanism including a rack bar movable in response to operation of said apparatus to effect the demanded propeller pitch adjustment and having an element actuatable by both rack bars for controlling the distributing valve in response to the differential of the movements of said mechanisms, a servo-motor for actuating the first mechanism of the differential and a speed responsive governor for controlling the servo-motor.

5. A system of control for an engine-propeller power-plant comprising, hydraulically operated propeller-pitch adjusting apparatus, a pressure system for the apparatus, a pressure pump driven by the plant, and a distributing valve in the pressure system and connected with the pump for controlling pressure flow to the apparatus, a differential mechanism disposed between the pressure system and the pitch adjusting apparatus for controlling the distributing valve and having a first mechanism including a rack bar actuatable by the pressure system and movable in response to a demand for propeller pitch adjustment and a second mechanism including a rack bar movable in response to operation of said apparatus to effect the demanded blade propeller pitch adjustment and having an element actuatable by both rack bars for controlling the distributing valve in response to the differential of the movements of said mechanisms, a servo-motor oping while the craft is at rest on the ground, there is generally no rotation of the propeller and the pressure source for effecting the selected shift is derived, at least for the beginning of the shift, from the stored pressure in the accumulator 59. Under those conditions trip of the valve 456 releases the pressure of the accumulator which flows through the passage 453 to the chamber 437 to unbalance the valve 432 which then opens to apply the accumulator pressure through valves 452a and 425 to the pressure line 239 to the distributor valve and the torque unit C which shifts the blades sufficiently that windmilling will ensue if the air is moving relative thereto, such as the craft being in flight. If unfeathering is done while the craft is at rest on the ground with the engine not operating, then the unfeathering function must be accomplished wholly by the pressure available in the accumulator, but if the craft is in flight, the unfeathering proceeds by accumulator pressure until the windmilling of the propeller either starts the engine or drives the pumps fast enough to develop sufficient pressure in the pressure line 239 and consequently in the chamber 426 to excel the potential of the accumulator. At the instant of shifting the control 500 for unfeathering, the pressure in line 239 is low and the unit 240 effects connection of the pumps 166 and 167 with the pressure line 239 through the ports 290, 291 and check valve 292 for supplementing the pump 168, and the unit 240 also closes the drain from the pressure control valve port 251a so that the stored potential of the accumulator is not wasted. The shift to feathering, unfeathering, braking and return from braking to the governed range of pitch is effected by manual actuation of the lever 500 of Fig. 40 corresponding to manual movement of the lever 152 of Fig. 1, and is capable of superposition of the governor control at any time.

Manual control of low blade angle is desirable because it is difficult to control low blade angle by governor action since the ratio of increment of change of torque absorption by the propeller to increment of blade angle change is too low for proper control by the governor. Since engine speed is limited by some means such as an automatic fuel control, it is possible manually to render the governor inoperative to effect blade angle control by causing its spring to overbalance centrifugal force acting upon its valve and, concurrently, manually to effect blade angle control suitable for braking.

When taxying on the ground is desired, rollers 325 and 357 may be moved to the right of positions 325' and 357' respectively. The governor loses control because spring 323 overbalances centrifugal force on valve 315 at engine taxying speed. Roller 357 is engaged by cam surface 381b according to the position of roller 357 to the right of 357'. By moving lever 500, roller 357 and consequently cam 381 may be positioned for forward motion of the airplane or for reverse motion or for stopping.

When feathering is desired, lever 500 is moved counterclockwise to feathering control position to condition the governor, by extreme left movement of roller 325 to the left of the center line of action of spring 323, for feathering. Spring 323 will then assist centrifugal force to move valve 315 up to close port 312a thereby conditioning, through the differential 370, the distributor 190 for feathering. If the hydraulic system of the governor should fail to provide adequate pressure in cylinder 377, spring 386 will urge cam surface 381c toward roller 357. Therefore left movement of roller 357 into position corresponding to the feathering position of roller 325, causes cam 381 to be moved down by the action of roller 357 on surface 381c so that the distributor 190 will be conditioned for feathering. When the governor fails to effect feathering in response to extreme counterclockwise movement of lever 500, said movement of lever 500 effects through the coaction of roller 357 and cam surface 381c the control of the torque units for feathering.

Cam 381' in Fig. 25 adds to cam 381 the surface 381d which may coact with the roller 357 so as to limit downward movement of piston 378 under governor action, thereby limiting the higher blade angles obtained to proper values in case of failure of the governor to function properly. For example, improper governor action might result from sticking of the valve 315 in a position causing too much increase of pressure in cylinder 377.

Fig. 42 shows maximum and minimum blade angles corresponding to position of control ring 157 (Fig. 1) which actuates the carriages 350 and 474 which are represented in Fig. 40 by the part 501. Line P—Q—R—S represents the low limit of blade angle as controlled manually, by the coaction of roller 357 with the cam surfaces 381c, 381a, 381b. Line P—T—U—V represents the maximum values of blade angle as limited by the coaction of roller 357 with cam surface 381d. Line W—X represents governor speed settings for various positions of control ring 157. The blade angle for various governor settings in the working range can lie between the maximum T—U determined by cam surface 381d and the minimum Q—R determined by surface 381a, said minimum being the minimum angle for which governing is possible at ground level, and being a satisfactory angle for engine starting and for idling. For positions of control ring 157 to the right of the maximum speed range, the blade angle can be between the maximum values represented by U—V and the minimum values represented by R—S which are the values which exist when braking or taxying. T—P represents the maximum angle when going into feathering by governor control and Q—P represents angle when going into feathering as result of manual control, the governor being non-operative to effect feathering.

In case of failure of the hydraulic system of the governor 300 or in case the governor fails to establish a pressure in the cylinder 377 of the differential 370 sufficient to overcome the spring 386, direct manual control of blade angle is still provided by moving lever 152 (Fig. 1) which is represented by lever 500 (Fig. 40).

The system can be adapted for use without the propeller-speed responsive governor 300 and its hydraulic system if it is desired to control blade angle manually or by some automatic device external to the system. In such case the piston 378 of the differential unit 370 would still serve as a spring abutment member and the cylinder 377 as a guide for the rod 379 which the spring 386 would urge upwardly so that the cam on the upper end of rod 379 would engage the roller 357 which is supported for adjustment in a direction parallel to the propeller hub axis. For this purpose the governor body 301 might be retained to provide a support for the carriage 350 (Fig. 16) which carries the roller 357 and the shoe 354 for engaging the control ring 157 (Fig. 3). The cam on the end of rod 379 would be shaped to erated by fluid pressure for actuating the first mechanism of the differential in the direction of propeller pitch adjustment increase, an independent pressure system for operating said servo-motor and including a second pump driven by the plant providing a source of fluid under pressure, a spring actuating the first mechanism in the direction of propeller pitch adjustment decrease, a speed responsive governor valve open to the pressure system and operable upon the first said mechanism for controlling the pressure of the fluid actuating the servo-motor, and means including a part of said first mechanism operable under manual control for variably limiting the propeller pitch adjustment decreasing movement of said mechanism.

6. A system of control for an engine-propeller power-plant comprising, hydraulically operated blade angle change apparatus, a pressure system for the apparatus, a pressure pump driven by the plant, and a distributing valve in the pressure system and connected with the pump for controlling pressure flow to the apparatus, a differential mechanism disposed between the pressure system and the pitch adjusting apparatus for controlling the distributing valve and having a first mechanism including a rack bar actuatable by the pressure system and movable in response to a demand for blade angle change and a second mechanism including a rack bar movable in response to operation of said apparatus to effect the demanded blade angle change and having an element autuatable by both rack bars for controlling the distributing valve in response to the differential of the movements of said mechanisms, a servo-motor operated by fluid pressure for actuating the first mechanism of the differential in the direction of pitch increase, a source of fluid under pressure for said servo-motor, independent of said apparatus pressure system, a spring actuating the first mechanism in the direction of pitch decrease, a speed responsive governor valve open to the pressure system and operable upon the first said mechanism for controlling the pressure of the fluid actuating the servo-motor, and means including a part of said first mechanism operable under manual control for variably limiting pitch-controlling movement of said first mechanism.

7. A system of control for an engine-propeller power-plant comprising, hydraulically operated blade angle change adjusting apparatus, a pressure system for the apparatus, a pressure pump driven by the plant, and a distributing valve in the pressure system and connected with the pump for controlling pressure flow to the apparatus, a differential mechanism disposed between the pressure system and the pitch adjusting apparatus for controlling the distributing valve and having a first mechanism including a rack bar actuatable by the pressure system and movable in response to a demand for blade angle change and a second mechanism including a rack bar movable in response to operation of said apparatus to effect the demanded blade angle change and having an element actuatable by both rack bars for controlling the distributing valve in response to the differential of the movements of said mechanisms, a speed responsive governor valve open to the pressure system and operable upon the first said mechanism for controlling the first mechanism of the differential, means for adjusting the governor to maintain various speeds, means for variably limiting the pitch-controlling movements of said mechanism, and a device for concurrently operating both said means.

8. In a hydraulically controlled constant speed propeller mechanism having pitch shiftable blades, the combination comprising, a speed responsive governor valve for sensing speed change and for applying a corrective function to the blades, means providing a relatively low potential pressure source connected with and controlled by said governor valve, means providing a fluid pressure responsive differential mechanism connected with said pressure source and governor valve for introducing the governor applied corrective function to the blades, a blade torque unit reversibly actuatable for shifting the pitch of the blades, a distributor valve actuated by the differential mechanism for applying fluid pressure to the torque units, means providing a realtively hight potential pressure source connected to said distributor valve for application to the said torque units, and means including a part of said differential mechanism for actuating said distributor valve for applying said high potential pressure to the torque unit when the governor applied corrective function is introduced by said differential mechanism.

9. In a hydraulically controlled constant speed propeller mechanism having pitch shiftable blades, the combination comprising, a speed responsive governor valve for sensing speed change and for applying a corrective function to the blades, manually operated means for selecting the speed level at which the governor valve is to sense and correct, means providing a differential mechanism having a first part operable by said manual means and responsive to the corrective functions of said governor valve and having a second part responsive to shift of said blades, a fluid pressure servo responding to said governor for actuating the said first part, a fluid pressure source connected to said governor valve and to the servo-motor of said first part of the differential mechanism, a blade torque unit reversibly actuatable for shifting the pitch of the blades, a distributor valve actuated by the differential mechanism for applying fluid pressure to the torque units, means providing a relatively high potential pressure source connected to said distributor valve, and means including a part movable by either part of said differential mechanism for actuating said distributor valve for applying said high potential pressure to the torque unit when the governor applied corrective function is introduced by said differential mechanism.

10. The combination set forth in claim 9 wherein the manually operated means also selectively conditions the propeller mechanism for additional functions as feathering, unfeathering, negative pitch and restoration to positive pitch, and means including a variable cam actuator and the moving element of the fluid pressure servo interposed between said manually operated means and said differential mechanism, whereby manual control of the torque units is superimposed on the governor applied corrective function when the propeller is rotating at speeds not satisfactorily controlled by said governor.

11. In a hydraulically controlled constant speed propeller mechanism having pitch shiftable blades, the combination comprising, a blade torque unit for changing the blade pitch, a distributor valve for applying fluid pressure to the torque unit, means providing a fluid pressure source communicating with the distributor valve and including a plurality of substantially constant delivery pumps operable upon rotation of the propeller, means providing flow control means for connecting and disconnecting the delivery of certain of said pumps to the fluid pressure source as demands of fluid potential by said distributor valve are varied, a pressure storage means, and a control valve connecting the pressure storage means with the fluid pressure source, speed sensitive means for actuating said distributor valve including a governor valve responding to propeller rotation, a differential mechanism and a separate source of fluid pressure for said governor valve, said differential mechanism including a first part responsive to control by said governor valve, a second part responsive to pitch shifting movement of said blade and a third part interconnecting said first and second parts for actuating said distributor valve, manually controlled means for selecting the speed level at which the governor valve will control and for effecting control of said pressure storage control means, and means including a part of said differential mechanism cooperating with the manually controlled means for effecting actuation of said distributor valve for speeds outside of the range of governed speeds for said governor valve, whereby when said pressure storage means control valve is opened to apply the stored pressure to the fluid pressure source for the distributor valve, said differential mechanism will be actuated for control of the distributor valve irrespective of the inability of the governor valve to effect its control.

12. The combination set forth in claim 11, wherein speed responsive latch means operatively connected with and actuated by movement of the manually controlled means outside of the range of governed speeds operates to maintain the control valve for the pressure storage means open to the pressure source upon predetermined actuation of the manual means until the pressure source falls in potential to a point below the potential of the stored pressure potential.

13. In a hydraulically controlled constant speed propeller mechanism having pitch shiftable blades, the combination comprising, a speed responsive governor valve for sensing speed change and for applying a corrective function to the blades, means providing a relatively low potential pressure source for said governor valve, manually operated means actuating the governor valve for selecting the speed level at which said governor valve will sense a speed change and apply a corrective function, and for selecting extremes of blade shift at either end of the governed speed range, means providing a differential mechanism having a first part cooperable with said manually controlled means and under the influence of the corrective function of said governor valve, and having a second part responsive to blade shifting movement, fluid pressure means for shifting the blades including a distributor valve under the control of the differential mechanism and a separate fluid pressure system connected with said distributor valve, means for varying the supply of fluid in said latter system as the needs of the pressure application by said distributor valve are demanded including a principal pump supplying pressure during normal speed governing operation, and additional pumps with a flow control valve responsive to low pressure potential in said system for adding to the system the delivery of the additional pumps, whereby selection by the manual control means of extremes of blade shift may be manually controlled should the governor valve fail to adequately control.

14. In a system of control for an engine-propeller power-plant having hydraulically operated propeller-pitch adjusting apparatus, a pressure system for the apparatus and a pressure pump driven by the plant, the combination comprising, a distributing valve in the pressure system and connected with the pump for controlling pressure flow to the apparatus, a differential mechanism disposed between the pressure system and the pitch adjusting apparatus for controlling the distributing valve and having a first mechanism including a rack bar actuatable by the pressure system and movable in response to a demand for propeller pitch adjustment and a second mechanism including a rack bar movable in response to operation of said apparatus to effect the demanded propeller pitch adjustment and having an element actuatable by both rack bars for controlling the distributing valve in response to the differential of the movements of said mechanisms, a speed responsive governor valve open to the pressure system and operable upon the first said mechanism for controlling the demanding movement of the differential mechanism to effect a corrective propeller pitch adjustment when there is a deviation from a selected governed speed, manually operable means actuating the governor valve for selecting the governed sped to be maintained, and means under manual control for conditioning the differential to obtain the feathering propeller pitch adjustment under conditions where the governor fails to effect feathering although manually conditioned to do so, said last recited means including said rack bar of said first mechanism, a cam member operatively connected to the said rack bar and a cam follower engaging said member.

15. In a system of control for an engine-propeller power-plant having hydraulically operated propeller-pitch adjusting apparatus, a pressure system for the apparatus and a pressure pump driven by the plant, the combination comprising, a distributing valve in the pressure system and connected with the pump for controlling pressure flow to the apparatus, a differential mechanism disposed between the pressure system and the pitch adjusting apparatus for controlling the distributing valve and having a first mechanism including a rack bar actuatable by the pressure system and movable in response to a demand for propeller pitch adjustment and a second mechanism including a rack bar movable in response to operation of said apparatus to effect the demanded propeller pitch adjustment and having an element actuatable by both rack bars for controlling the distributing valve in response to the differential of the movements of said mechanisms, a speed responsive governor valve open to the pressure system and operable upon the first said mechanism for controlling the demanding movement of the differential mechanism to effect a corrective propeller pitch adjustment when there is a deviation from a selected governed speed, manually operable means actuating the governor valve for selecting the governed speed to be maintained, and means under manual control for conditioning the differential to confine the propeller pitch adjustment to a certain range of high limits under conditions where the governor fails to maintain the propeller pitch adjustment within said high range, said last recited means including said rack bar of said first mechanism, a member operatively connected to the said rack bar and having a plurality of definitive cam surfaces and a cam follower engaging one of said cam surfaces.

DAVID A. RICHARDSON.

REFERENCES CITED

The following references are of record in the file of this patent:

UNITED STATES PATENTS

| Number | Name | Date |
|---|---|---|
| 2,105,473 | Dean | Jan. 18, 1938 |
| 2,163,663 | Caldwell | June 27, 1939 |
| 2,204,639 | Woodward | June 18, 1940 |
| 2,307,102 | Blanchard et al. | Jan. 5, 1943 |
| 2,348,323 | Binder | May 9, 1944 |
| 2,377,633 | Kettering | June 5, 1945 |
| 2,403,532 | Hoover | July 9, 1946 |
| 2,404,552 | Van der Werff | July 23, 1946 |
| 2,435,080 | Hoover | Jan. 27, 1948 |

FOREIGN PATENTS

| Number | Country | Date |
|---|---|---|
| 212,020 | Switzerland | Oct. 31, 1940 |
| 703,319 | Germany | Feb. 6, 1941 |